United States Patent [19]
Ujihara et al.

[11] 3,947,168
[45] Mar. 30, 1976

[54] FILM CASTING APPARATUS FOR THE PURIFICATION OF PHOTOGRAPHIC MATERIALS

[75] Inventors: Motohiro Ujihara; Itsuo Fujii; Yasunori Nagai, all of Minami-ashigara, Japan

[73] Assignee: Fuji Photo Film Co., Ltd., Minami-ashigara, Japan

[22] Filed: July 27, 1970

[21] Appl. No.: 64,884

Related U.S. Application Data

[62] Division of Ser. No. 726,047, May 2, 1968, abandoned.

[30] Foreign Application Priority Data

May 4, 1967 Japan .............................. 42-28388
May 10, 1967 Japan ......................... 42-39069[U]

[52] U.S. Cl. ................................... 425/71; 425/223
[51] Int. Cl.² ........................................ B29D 7/02
[58] Field of Search .............. 425/71, 223, 224, 230

[56] References Cited
UNITED STATES PATENTS

| | | | |
|---|---|---|---|
| 1,529,813 | 3/1925 | Restein | 425/224 X |
| 2,534,629 | 12/1950 | Schultze | 425/223 X |
| 2,624,913 | 1/1953 | Montross et al. | 425/230 X |
| 2,798,004 | 7/1957 | Weigel | 117/2 |
| 3,396,027 | 8/1968 | McFall et al. | 96/94 |
| 3,429,957 | 2/1969 | Merten | 425/71 X |
| 3,539,426 | 11/1970 | Nakai et al. | 156/249 |

Primary Examiner—Francis S. Husar
Assistant Examiner—David S. Safran
Attorney, Agent, or Firm—Sughrue, Rothwell, Mion, Zinn & Macpeak

[57] ABSTRACT

A process for effectively and rapidly desalting gelatino silver halide emulsions for photographic light sensitive elements wherein a thin film of the emulsion is formed and gelled by cooling and thereafter washed with cold water.

1 Claim, 2 Drawing Figures

INVENTORS
MOTOHIRO UJIHARO
ITSUO FUJII
YASUNORI NAGAI

BY
Sughrue, Rothwell, Mion, Zinn & Macpeak
ATTORNEYS

FILM CASTING APPARATUS FOR THE PURIFICATION OF PHOTOGRAPHIC MATERIALS

CROSS-REFERENCE TO RELATED APPLICATION

The present application is a divisional application of Ser. No. 726,047 filed May 2, 1968, and now abandoned.

BACKGROUND OF THE INVENTION

1. Field of the Invention

The present invention relates to a method of purifying photographic materials and more particularly to a method of purifying dispersions or emulsions for photographic materials by continuously gelling the dispersions or emulsions under cooling while forming them into thin films and thereafter washing said thin films with water. This invention further relates to an apparatus for conducting the above method.

2. Description of the Prior Art

In order to remove impurities from a dispersion or emulsion for photographic material mainly consisting of gelatin and capable of being gelled by cooling, such as, gelatino silver halide emulsions, matting-agent-containing gelatin emulsions, coupler-containing gelatin emulsions, dye-containing gelatin emulsions for filter layers, and the like, in particular, for desalting gelatino silver halide emulsions, there has usually been employed a method wherein the dispersion or emulsion is gelled by cooling, cut into fine noodle like strands, and washed with cold water. The dispersion or emulsion however must be sufficiently gelled by cooling in order to cut it into the fine strands prior to water washing and hence the cutting operation must be conducted separately from the cooling operation, which requires a long period of time for finishing the purification as well as for installations. Moreover, in the above method, the more finely the gelled dispersion or emulsion is cut, the more effectively and rapidly the water washing can be accomplished. However, if the gel is cut into finer pieces, the sufficient recovery of the finer pieces after washing becomes difficult, resulting in large loss thereof. Accordingly, there is a limit in the degree of fineness to which the strands can be cut which makes it impossible to increase sufficiently the washing efficiency. Furthermore, the conventional method is accompanied with such disadvantages that it is difficult to conduct the purification steps continuously through cooling, cutting and washing and it is difficult to obtain a dispersion or emulsion having constant and uniform qualities.

Therefore, an object of this invention is to provide a method and apparatus of purifying photographic materials as mentioned above capable of easily and continuously purifying gellable dispersions or emulsions for photographic materials.

Another object of the invention is to provide a method and apparatus for purifying gellable dispersions or emulsions for photographic materials in which water washing can be rapidly accomplished in a short period of time.

A further object of this invention is to provide a method and apparatus for purifying photographic materials which is capable of obtaining purified photographic dispersions or emulsions having consistently uniform qualities with reduced loss.

SUMMARY OF THE INVENTION

The above objects of the present invention can be attained according to the present invention by forming a thin film of a gellable dispersion or emulsion of a photographic material, gelling said thin film by cooling, and bringing the thin film gelled into contact with cold water.

BRIEF DESCRIPTION OF THE DRAWINGS

The invention will now be explained in detail by referring to the accompanying drawings, in which.

DETAILED DESCRIPTION OF PREFERRED EMBODIMENTS

Figure 1:
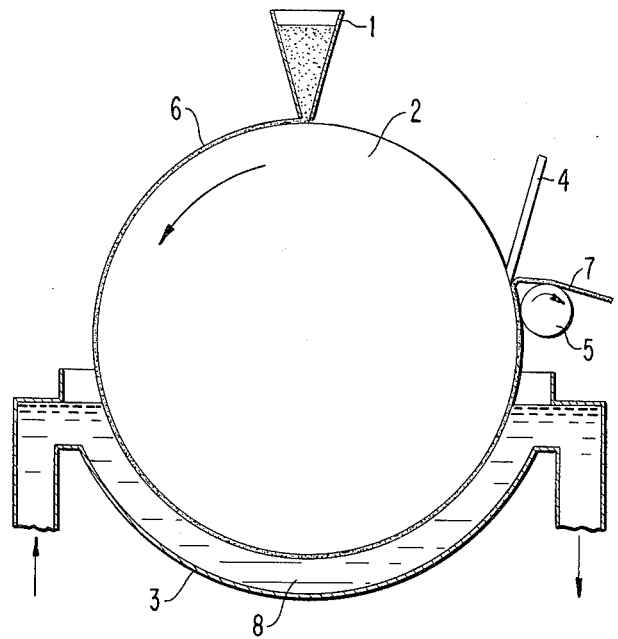
FIG. 1 is a schematic cross sectional view showing one embodiment of the present invention.

In FIG. 1, a gellable dispersion or liquid for photographic material as mentioned above is supplied in the form of a thin film over the surface of a cylindrical support or drum 2 rotating at a constant speed by means of a hopper 1 disposed above the drum. The lower section of the drum is immersed in cold water 8 in a tank 3 so as to maintain the surface of the drum at a low temperature. The dispersion which is spread over the surface of the drum in the form of a thin film is immediately gelled and caused to enter the cold water in tank 8, where the film is brought into contact with the cold water effectively in an enlarged area to effect the purification of the film gelled. In order to purify or desalt the gelled film more effectively, it is desirable to flow the cold water through the tank. The gelled film 7 of the dispersion or emulsion thus washed or purified is then stripped from the surface of the drum by means of a scraper 4 and withdrawn from the system through a conveyor 5.

Figure 2:
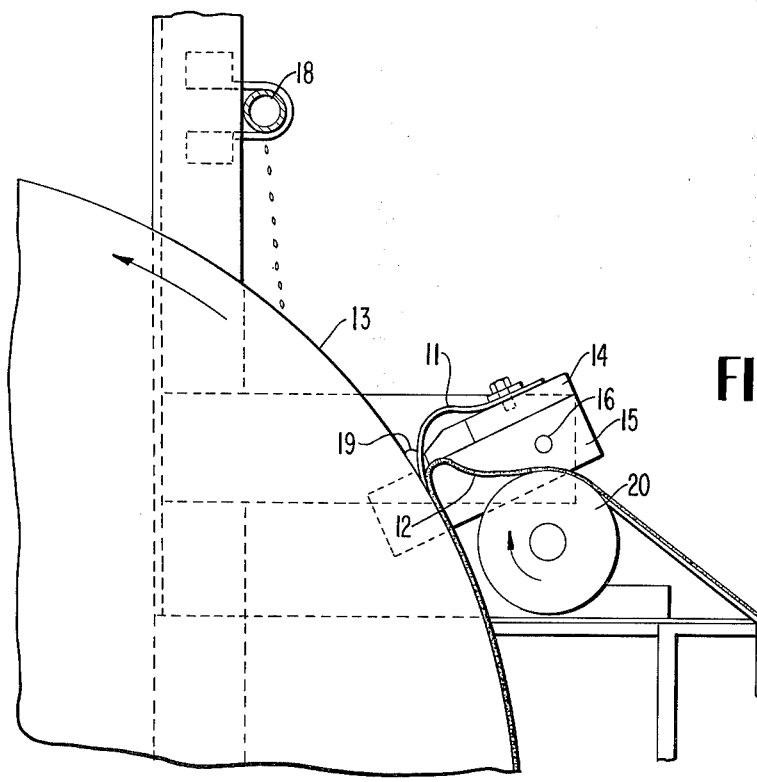
FIG. 2 is a partially enlarged schematic cross sectional view showing the scraping means in another embodiment of this invention.

In FIG. 2 there is illustrated a preferred embodiment of the scraping mechanism used in this invention. The gelled thin film 12 of the photographic dispersion or emulsion is stripped from the surface of a rotary drum 13 by means of a scraper 11 which is fixed to a supporting means 14 mounted on frame 15. The frame 15 is so supported by axis 16 that the angle of the supporting means 14 to the surface of the drum, that is the angle of the scraper 11 to the surface of the drum, can be varied. The scraper 11 is preferably made of a plastic such as polyfluoroethylene or nylon and is preferably bent into a convex shape as shown in the figure. The angle between the top portion of the scraper in contact with the surface of drum and the surface is preferably less than 60°. The purified film thus scraped is withdrawn through a conveyor roll or guide roll 20. In the embodiment shown in FIG. 2 there is provided a water-supplying pipe 18 which supplies clear water dropwise onto the surface of the drum. The water thus supplied is collected into a water bead of pool 19 in the space between the surface of the drum and the top portion of the scraper. The water acts as a lubricant for the scraper to the drum surface. Since the top of the scraper is closely contacted with the drum surface, the entrance of water into the purified film can be prevented and the water can be removed from the opposite sides of the drum.

In the present invention, the thickness of the dispersion or emulsion formed on the rotary drum is preferably 30–300 microns for securing the strength of film enduring vigorous washing as well as for securing rapid gelling and rapid purifying or desalting. Any known method may be employed for forming such thin films. The thickness of the film may be varied in the aforesaid range according to the degree of purification or desalting desired. In the foregoing range of film thickness, the desalting by water washing can be completed for several minutes and the steeping distance and moving speed of the thin film can be correspondingly determined. Control of the degree of purifying or desalting in an apparatus having a constant steeping distance of a thin film may be effected by varying the moving speed of the thin film or by varying the film thickness in the foregoing range.

The temperature of a dispersion or emulsion during the formation of the thin film, depending on the concentration of gelatin contained therein is preferably as low as possible in order to promote gelling and suitably in the range of 30° to 45°C in order to form a stable thin film. The washing water is preferably fed to a washing tank at a low temperature to prevent a thin film of gelled dispersion from softening, that is, in the range of 2° to 15°C in an amount enough for desalting, and sufficiently stirred in the washing tank.

The above mentioned embodiment is illustrative only and is not intended to limit the invention. In the practice of the invention, a thin film may be formed by means of not only a cylindrical rotary drum but also a moving strip. Other film forming methods may be employed, of course. In each case the type of a water washing tank is correspondingly designed. Although the contact of a thin film with washing water is carried out by steeping in a washing tank together with a support in the foregoing embodiment, the thin film may be contacted with washing water alone or may be contacted with the washing water after removal onto another support.

In the method of this invention, a dispersion or emulsion to be processed is formed into a thin film whereby a rapid gelation is made possible and subsequently contacted with washing water whereby a rapid purification can be effected. Since the dispersion or emulsion is passed through the water washing step in the form of a continuous thin film, the recovery of the dispersion can readily be completed with little loss accompanying the washing water and the resulting dispersion or emulsion has a constant uniform quality.

In accordance with the method of the invention, as illustrated above, a dispersion or emulsion having a desired degree of purification can rapidly be obtained through the continuous operation from cooling to water washing by selecting conditions suitably.

The following example is given to illustrate further the invention.

EXAMPLE

A gelatino silver bromide emulsion containing 55 parts by weight silver bromide and 5 parts gelatin per 1000 parts the total weight was prepared in the conventional manner, mixed further with 100 parts of gelatin and then subjected to physical ageing. The electric conductivity of the emulsion was 56,000$\mu$V/cm. The emulsion was on the surface of a rotating cylindrical support or drum to give a thickness of 150 microns, while keeping the temperature of the emulsion at 40°C. The cylindrical support was immersed in a water washing tank to which washing water at 15°C was fed with adequate stirring, in a system as shown in the accompanying drawing. The circumference immersed extended to 1 m. and the tank was simultaneously rotated at a circumferential speed of 95 cm/min.

The emulsion was gelled, formed into a thin film, passed through the washing tank with movement of the support, taken out of the tank, stripped from the surface of the support and recovered. The so obtained, water-washed emulsion was dissolved and the electric conductivity was measured to give 1,200$\mu$V/cm. Examination of the emulsion, after being aged in the conventional manner, gave the same characteristics as the ordinary emulsions.

What is claimed is:

1. A desalting apparatus for desalting a photographic emulsion consisting of a rotatable drum having a flat cooling surface, a cooling bath containing cold water and means to flow said cold water through said cooling bath, the lower section of said rotatable drum being immersed in said cold water, a hopper for supplying the photographic emulsion to said flat surface to form thereon a thin film of said photographic emulsion having a thickness of from 30 to 300 microns and scraper means for scraping the gelled and desalted film of the photographic emulsion from said flat surface after passage through said cold water bath, said scraper means consisting of a flexible plastic sheet, and wherein said apparatus further consists of a water supply member disposed above said scraper means to supply fresh water to the end of said scraper.

* * * * *